(12) United States Patent
He et al.

(10) Patent No.: US 9,550,310 B2
(45) Date of Patent: Jan. 24, 2017

(54) METHOD AND APPARATUS TO TEST AN AUTOMATIC STOP SAFETY FEATURE OF A ROTARY SAW

(71) Applicant: UNDERWRITERS LABORATORIES INC., Northbrook, IL (US)

(72) Inventors: Fan He, Gurnee, IL (US); Hai Jiang, Buffalo Grove, IL (US); Mahmood Tabaddor, Rochester, MI (US)

(73) Assignee: UL LLC, Northbrook, IL (US)

( * ) Notice: Subject to any disclaimer, the term of this patent is extended or adjusted under 35 U.S.C. 154(b) by 77 days.

(21) Appl. No.: 14/530,531

(22) Filed: Oct. 31, 2014

(65) Prior Publication Data

US 2016/0121512 A1    May 5, 2016

(51) Int. Cl.

| | | |
|---|---|---|
| *B27G 19/02* | (2006.01) | |
| *B23Q 11/06* | (2006.01) | |
| *G01M 99/00* | (2011.01) | |
| *B23D 59/00* | (2006.01) | |
| *G01M 13/00* | (2006.01) | |

(52) U.S. Cl.
CPC .............. *B27G 19/02* (2013.01); *B23D 59/001* (2013.01); *B23Q 11/06* (2013.01); *G01M 13/00* (2013.01); *G01M 99/005* (2013.01); *G01M 99/008* (2013.01)

(58) Field of Classification Search
None
See application file for complete search history.

(56) References Cited

U.S. PATENT DOCUMENTS

| | | |
|---|---|---|
| 7,055,417 B1 | 6/2006 | Gass |
| 7,971,613 B2 * | 7/2011 | Gass .................. B23Q 11/0092 |
| | | 144/136.1 |
| 2006/0247795 A1 | 11/2006 | Gass et al. |

FOREIGN PATENT DOCUMENTS

| | | |
|---|---|---|
| DE | 202014003111 U1 | 7/2014 |
| WO | WO-2010027598 A1 | 3/2010 |

OTHER PUBLICATIONS

International Search Report and The Written Opinion of the International Searching Authority for application No. PCT/US2015/056801, dated Jan. 25, 2016.

\* cited by examiner

*Primary Examiner* — Robert R Raevis
(74) *Attorney, Agent, or Firm* — Marshall, Gerstein & Borun LLP

(57) ABSTRACT

A test apparatus for testing of a stop mechanism on a saw includes a support arm movable relative to a blade of the saw from a first position to a second position. The test apparatus also includes a simulation member coupled to the support arm. In the first position, the first end of the simulation member is offset from a portion of the blade of the saw, and in the second position, the first end of the simulation member is adapted to be in contact with the portion of the blade of the saw. The test apparatus further includes circuitry operatively connected to the simulation member to replicate an electrical property of a human finger such that contact between the blade and the first end of the simulation member triggers the stop mechanism of the saw.

27 Claims, 5 Drawing Sheets

METHOD AND APPARATUS TO TEST AN AUTOMATIC STOP SAFETY FEATURE OF A ROTARY SAW

FIELD OF THE DISCLOSURE

This disclosure relates generally to rotary saws and, in particular, to a method and apparatus to test an automatic stop safety feature of a rotary saw.

BACKGROUND

Rotary saws, such as table saws or hand-held circular saws, for example, are among the most versatile and widely-used of all types of saws. Such rotary saws allow a user to perform many types of cuts (such as cross cuts and plunge cuts, for example) and cut through a wide variety of materials, such as paneling, framing timbers, and cement. A typical rotary saw includes a circular saw blade that is rotated about a central axis by an electro-mechanical drive. The saw blade has a plurality of cutting features disposed around a circumference of the blade, and a portion of the blade extends beyond a guide feature. When a piece of material to be cut is displaced along the guide feature towards the portion of the blade that extends beyond the guide feature, the cutting features of the blade engage the piece of material, thereby cutting a channel in or through the piece of material. However, because the piece of material is typically manually moved towards the blade by a user, the user is at risk of serious injury if the cutting features of the blade contacts a finger of the user. To reduce or eliminate the risk of injury, several rotary saws have an active detection and mitigation feature that (1) detects contact (or imminent contact) by a human finger and (2) takes an action to mitigate any further injury (stops the rotation of the circular blade and/or retracts the blade such that no portion of the blade can further damage the finger). Each of these operations must occur in a very short amount of time—typically, well under one second—to be effective.

BRIEF SUMMARY OF THE DISCLOSURE

One aspect of the present disclosure is directed to a test apparatus for testing of a stop mechanism of a saw includes a support arm movable relative to a blade of the saw from a first position to a second position. The test apparatus also includes a simulation member coupled to the support arm, and the simulation member has a first end and a second end. In the first position, the first end of the simulation member is adapted to be offset from a portion of the blade of the saw, and in the second position, the first end of the simulation member is adapted to be in contact with the portion of the blade of the saw. The test apparatus further includes circuitry operatively connected to the simulation member, wherein the circuitry and simulation member cooperate to replicate an electrical property or a thermal property of a human finger and human body such that contact or near contact between the blade and the first end of the simulation member when the support arm is in the second position triggers the stop mechanism of the saw.

Another aspect of the present disclosure is directed to a method of testing a stop mechanism of a saw including activating the rotation of a blade of the saw and displacing a support arm relative to a portion of the blade of the saw from a first position in which a first end of a simulation member coupled to the support arm is offset from the portion of the blade of the saw to a second position in which the first end of the simulation member is in contact with the portion of the blade of the saw. The method can also include measuring a depth of a cut made in the simulation member resulting from contact with the portion of the blade of the saw.

A further aspect of the present disclosure is directed to a test apparatus for testing of a stop mechanism on a saw includes a support arm movable relative to a blade of the saw from a first position to a second position. The test apparatus also includes a simulation member coupled to the support arm, and the simulation member has a first end and a second end. The simulation member includes a first portion comprising a first material and a second portion comprising a second material, and the first portion is disposed at the first end of the simulation member, and the first material is different than the second material. In the first position, the first end of the simulation member is adapted to be offset from a portion of the blade of the saw, and in the second position, the first end of the simulation member is adapted to be in contact with or immediately adjacent to the portion of the blade of the saw. The test apparatus additionally includes an impedance network electrically coupled to the simulation member, and the impedance member comprises at least one resistor and at least one capacitor. The impedance network and the simulation member cooperate to replicate an electrical property of a human finger such that contact between the blade and the first end of the simulation member when the support arm is in the second position triggers the stop mechanism of the saw.

DETAILED DESCRIPTION

Figure 1:
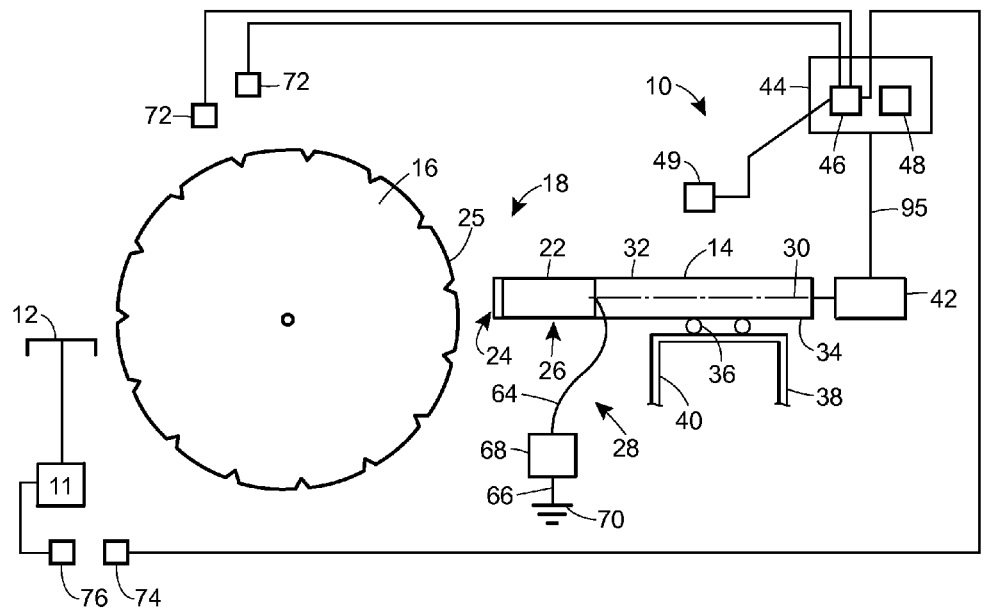
FIG. 1 is a schematic view of an embodiment of a test apparatus for the testing of a stop mechanism of a saw, with a support arm of the test apparatus in a first position.
Figure 2:
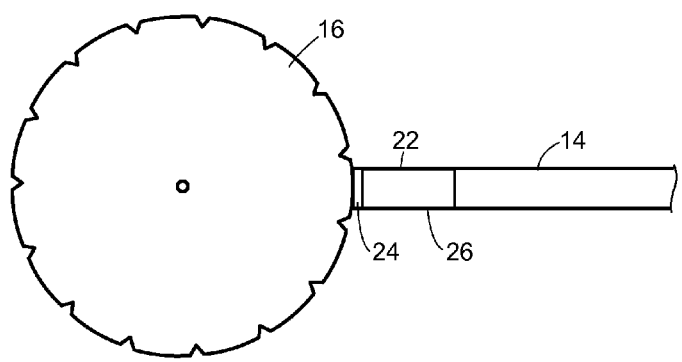
FIG. 2 is a schematic view of a portion of the embodiment of the support arm of FIG. 1 in the second position.
Figure 3A:
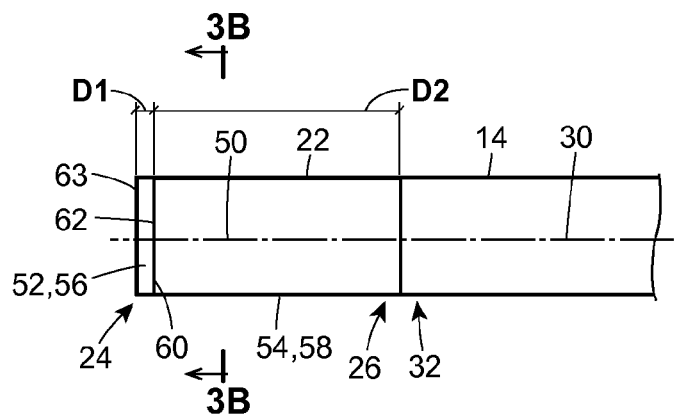
FIG. 3A is a side view of an embodiment of a simulation member and a portion of the support arm.
Figure 4A:
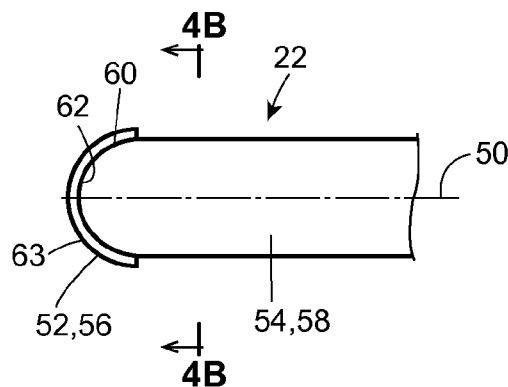
FIG. 4A is a side view of portion of an embodiment of a simulation member.

As illustrated in FIG. 1, a test apparatus 10 for the testing of a stop mechanism 11 on a saw 12 includes a support arm 14 movable relative to a blade 16 of the saw 12 from a first position 18 to a second position 20 (see FIG. 2). The test apparatus 10 also includes a simulation member 22 coupled to the support arm 14, and the simulation member 22 has a first end 24 and a second end 26. As shown in FIGS. 3A and 4A, the simulation member 22 may include a first portion 52 and a second portion 54, and the first portion 52 may be disposed at the first end 24 of the simulation member 22. The first portion 52 may comprise a high impedance material and may be adapted to simulate the outer dry layer of the human finger skin. The second portion 54 may comprise a low impedance material and may be adapted to simulate the inner wet layer of the human finger including blood and other soft tissues. In the first position 18 (illustrated in FIGS. 1 and 5B), the first end 24 of the simulation member 22 is adapted to be offset (e.g., spaced) from a portion 25 (e.g., a circumferential edge portion) of the blade 16 of the saw 12, and in the second position 20 (see FIGS. 2 and 5C), the first end 24 of the simulation member 22 is adapted to be in contact with the portion 25 of the blade 16 of the saw 12. Referring again to FIG. 1, the test apparatus 10 further includes circuitry 28 operatively connected to the simulation member 22. The circuitry 28 and the simulation member 22 cooperate to replicate an electrical property of a human finger and human body such that contact or near contact between the blade 16 and the first end 24 of the simulation member 22 triggers the stop mechanism 11 of the saw 12. So configured, the test apparatus 10 allows for a consistent and predictable triggering of a variety of stop mechanisms 11 used on a variety of rotary saws, thereby allowing corresponding performance characteristics (e.g., damage to the simulation member 22) of each stop mechanism 11 to be verified, tested, and/or compared.

Turning to the test apparatus 10 in more detail, the support arm 14 may have any suitable shape or combination of shapes to allow the support arm 14 (and the simulation member 22) to displace from the first position 18 to the second position 20. For example, as illustrated in FIG. 1, the support arm 14 may be elongated and may extend along a longitudinal axis 30 from a first end 32 to a longitudinally-opposite second end 34, and the support arm 14 may displace along or substantially along the longitudinal axis 30. The support arm 14 may be a single, unitary part or may be an assembly comprising two or more parts. The support arm 14 may have any suitable cross-sectional shape or combination of shapes, such as a rectangular cross-sectional shape. In some embodiments, the support arm 14 may be a component of a slider rail assembly 36, and the support arm 14 may extend from a base having one or more rollers that support and guide the support arm 14 as it extends from and/or retracts into the base. The support arm 14 may be directly or indirectly coupled to a support frame 38 that may include a plurality of frame members 40 that cooperate to provide a stable base of support for the displaceable support arm 14.

Still referring to FIG. 1, the support arm 14 may be coupled to an actuator 42 that directly or indirectly displaces the support arm 14 between the first position 18 and the second position 20. The actuator 42 may be directly or indirectly coupled to any portion of the support arm 14, such as the second end 34 of the support arm 14. The actuator 42 may be any suitable type of actuator, such as a pneumatic actuator, hydraulic actuator, mechanical actuator, or electromechanical actuator. The actuator 42 may be in communication with a computer 44 having a processor 46 and a memory 48, and the computer 44 may issue a command to the actuator 42 to displace the support arm 14 between the first position 18 and the second position 20. The command may be an input by a user or may be generated by a program saved on the memory 48. The computer 44 may be in wireless communication with the actuator 42 or may communicate with the actuator by one or more wires 95. The actuator 42 may have a constant rate of travel or the rate of travel may vary. The rate of travel may be an input by a user or may be generated by a program saved on the memory 48. One or more sensors 49 (e.g., a photo detector, proximity sensor, Hall effect sensor, video camera, etc.) may be coupled to the computer 44 or processor 46 to verify the rate of travel and/or the displacement of the actuator 42.

As illustrated in FIGS. 1 and 3A, the simulation member 22 may be coupled to the support arm 14 such that the second end 26 of the simulation member 22 may be adjacent to or in contact with the first end 32 of the support arm 14. The simulation member 22 may include a first portion 52 and a second portion 54, and the second portion 54 may be disposed between the first portion 52 and the first end 32 of the support arm 14. However, the simulation member 22 may be secured to or coupled with any portion or portions of the support arm 14 to allow the first end 24 of the simulation member 22 to be offset from a portion of the blade 16 of the saw 12 in the first position 18 and to allow the first end 24 of the simulation member 22 to be in contact with the portion of the blade 16 of the saw 12 in the second position 20.

Figure 3B:
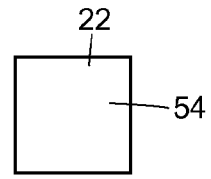
FIG. 3B is a section view of the embodiment of the simulation member of FIG. 3A taken along line 3B-3B of FIG. 3A.
Figure 4B:
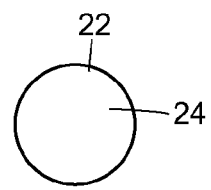
FIG. 4B is a section view of the embodiment of the simulation member of FIG. 4A taken along line 4B-4B of FIG. 4A.

As illustrated in FIG. 3A, the simulation member 22 may be elongated and may extend from the first end 24 to the second end 26 along a longitudinal axis 50, and the longitudinal axis 50 may be linear and parallel to or coaxially-aligned with the longitudinal axis 30 of the support arm 14. Alternatively, the longitudinal axis 50 may extend at an angle relative to the longitudinal axis 30 of the support arm 14 or may be curved. The simulation member 22 may have any suitable cross-sectional shape or combination of shapes. For example, as illustrated in FIGS. 3A and 3B, the simulation member 22 may have a square cross-sectional shape when viewed along the longitudinal axis 50. In other embodiments, the simulation member 22 may have the cross-sectional shape of a circle, an oval, a polygon (e.g., a hexagon), or a combination of shapes, when viewed along the longitudinal axis 50. In some embodiments, the cross-sectional shape of the simulation member 22 is constant along the entire longitudinal axis 50 or the cross-sectional shape may vary over all or a part of the longitudinal axis 50. In other embodiments, the cross-sectional shape of the simulation member 22 may be constant over the entire longitudinal axis 50, but the size of the cross-sectional shape may vary along the longitudinal axis 50. For example, as illustrated in FIGS. 4A and 4B, the simulation member 22 may have a circular cross-sectional shape along the longitudinal axis 50, but the cross-sectional diameter may reduce or converge along the longitudinal axis 50 at or adjacent to the first end 24 of the simulation member 22 such that the first end 24 is rounded. In some embodiments, the first end 24 of the simulation member 22 may have a partially spherical shape, such as the shape of a hemisphere. Similarly, the cross-sectional diameter may reduce or converge along the longitudinal axis 50 at or adjacent to the second end 26 of the simulation member 22 such that the second end 26 is rounded. In some embodiments, the second end 26 of the simulation member 22 may have a partially spherical shape, such as the shape of a hemisphere. The simulation member 22 may have the overall shape of a human finger in order to trigger stop mechanisms 11 that may have an optical triggering device.

As illustrated in FIG. 3A and as mentioned above, the simulation member 22 may include the first portion 52 and the second portion 54, and the first portion 52 may be disposed at or adjacent to the first end 24 of the simulation member 22. The first portion 52 may comprise a first material 56 and the second portion 54 may comprise a second material 58 that is different than the first material 56. The first material 56 and the second material 58 may cooperate to provide a suitable material stiffness/rigidity to the simulation member 22 such that deflection when the simulation member 22 is contacted by the blade 16 during testing is within an acceptable range. The first material 56 and second material 58 may also cooperate to provide a suitable material stiffness/rigidity such that the first material 56 and the second material 58 do not shred when the simulation member 22 is contacted by the blade 16 during testing. Such material stiffness/rigidity may also be provided by the shape of the simulation member 22.

As such, the simulation member 22 may have the general shape and mechanical properties of a human finger (1) to trigger a stop mechanism that may use an optical sensor to visually detect a finger, (2) to withstand a cut by the blade 16 that accurately approximates or simulates an injury to a human finger, and (3) to register the depth of the resulting cut. To this end, as illustrated in FIG. 3A, the first portion 52 may be planar and/or may have a square cross-sectional shape (e.g., measuring 12.5 mm by 12.5 mm) and may have a thickness (i.e., a first distance D1) in a range of about 1.0 mm to about 0.25 mm, and may be about 0.5 mm. The second portion 54 may have a square cross-sectional shape (measuring 12.5 mm by 12.5 mm) having a thickness (i.e., a second distance D2) in a range of about 20 mm to about 100 mm, and may be about 60 mm. Said another way, the first portion 52 may have an inner surface 62 that may be planar and disposed normal to the longitudinal axis 50 and an outer surface 63 that may be planar and may be longitudinally offset the first distance D1 from the inner surface 62. The first distance D1 may be constant and the shape of the first portion 52 may conform or substantially conform to a shape of an end portion 60 of the second portion 54. For example, as illustrated in FIG. 4A, the shape of the end portion 60 of the second portion 54 may be partially spherical and convex, the first portion 52 may have a complementary concave, partially spherical inner surface 62 that conforms in shape to the end portion 60. The outer surface 63 of the first portion 52 may therefore be partially spherical with a diameter greater than the inner surface 62.

The first portion 52 and the second portion 54 (that is, the first material 56 and the second material 58) may cooperate to reproduce or replicate (or substantially reproduce or substantially replicate) one or more electrical characteristics or properties (e.g., impedance, resistance, and/or voltage, for example) of a human finger such that contact or near contact between the simulation member 22 (e.g., with the first portion 52) will trigger the automatic stop feature 11 of one or more rotary saws 12 in the same manner that a human finger would trigger the automatic stop feature 11. In some embodiments, the electrical property may be at least one of a combined impedance (i.e., a measure of opposition to alternating current) of the simulation member 22 and the circuitry 28 or an impedance of the simulation member 22. It is understood that resistance could be replaced with impedance when a direct current is used instead of an alternating current.

It is critical that the simulation member 22 (and, in some embodiments, the simulation member 22 and the circuitry 28) replicate or substantially replicate the impedance of human skin over a range of environmental conditions (e.g., high ambient humidity and temperature) because the triggering of stop mechanisms 11 is designed to be triggered only by contact with human skin. Specifically, in stop mechanisms 11 that rely on one or more electrical properties of the human finger to determine a contact condition, changes in an AC signal supplied to the saw 12 may be detected by a sensor or processor in communication with the stop mechanism 11 by monitoring the impedance of the blade 16. That is, a monitoring AC signal (typically, a high frequency signal, such as several hundred kHz) is delivered to the blade 16, and due to contact with a human finger, the impedance of the blade 16 may be changed by the effects of the human body impedance. This change of blade impedance results in a corresponding change of the monitoring AC signal in the saw 12. The stop mechanisms 11 (or a sensor or processor in communication with the stop mechanism 11) may record a change in the monitoring AC signal and will make a decision that a contact condition has occurred. When the decision is made, the stop mechanism 11 will be triggered.

Accordingly, the first material 56 and second material 58 may each include any materials or combination of materials that replicate or simulate one or more electrical properties of a human finger, thereby allowing for the consistent triggering of the automatic stop mechanisms 11. The first material 56 and second material 58 may each be a conductive material, such as a conductive rubber material or a conductive organic material. For example, the first material 56 may be an ethylene propylene diene monomer (EPDM) polymer, and the second material 58 may be a conductive silicone. The first material 56 may have a first impedance when alternating current passes through the first material 56 and the second material 58 may have a second impedance when alternating current passes through the second material 58 (or the first material 56 may have a first resistance when direct current passes through the first material 56 and the second material 58 may have a second resistance when direct current passes through the second material 58), and the second impedance (or the second resistance) is not equal to the first impedance (or first resistance). In some embodiments, the first impedance (or first resistance) may be greater than—or significantly greater than—the second impedance (or the second resistance). More specifically, the first impedance may be generated by a material with resistivity between 100 kΩ·cm and 10 MΩ·cm and the second impedance may be generated by a material with resistivity between 0 and 10 Ω·cm at DC frequency. The first and second impedance—along with the circuitry 28 described in the following paragraph—may cooperate to achieve an overall impedance that replicates the worst case condition (i.e., lowest signal response at a given frequency) for human skin impedance, which may occur when human skin is dry. That is, the first material 56 of the first portion 52 may have a surface resistivity higher than approximately 100 kΩ·cm but less than approximately 10 MΩ·cm at DC frequency. In addition, the first material 56 of the first portion 52 should possess electrical properties that are comparable to those of a human finger.

As illustrated in FIG. 1, the test apparatus 10 further includes circuitry 28 operatively connected to one or more portions of the simulation member 22, and the circuitry 28 and simulation member 22 may cooperate to replicate an electrical property (e.g., impedance) of a human finger and a human body such that contact or near contact between the blade 16 and the first end 24 of the simulation member 22 when the support arm 14 is in the second position 20 triggers the stop mechanism 11 of the saw 12. Specifically, the circuitry 28 may include a first conductive wire 64 connected at a first end to one or more portions of the simulation member 22 (such as one or more portions of the second portion 54) and connected at a second end to a first end of an impedance network 68 (for example, the embodiment illustrated in FIG. 6). The circuitry 28 may also include a second conductive wire 66 connected at a first end to a second end of the impedance network 68 and connected to a second end to ground 70 (e.g., the chassis of the saw 12).

Figure 6:
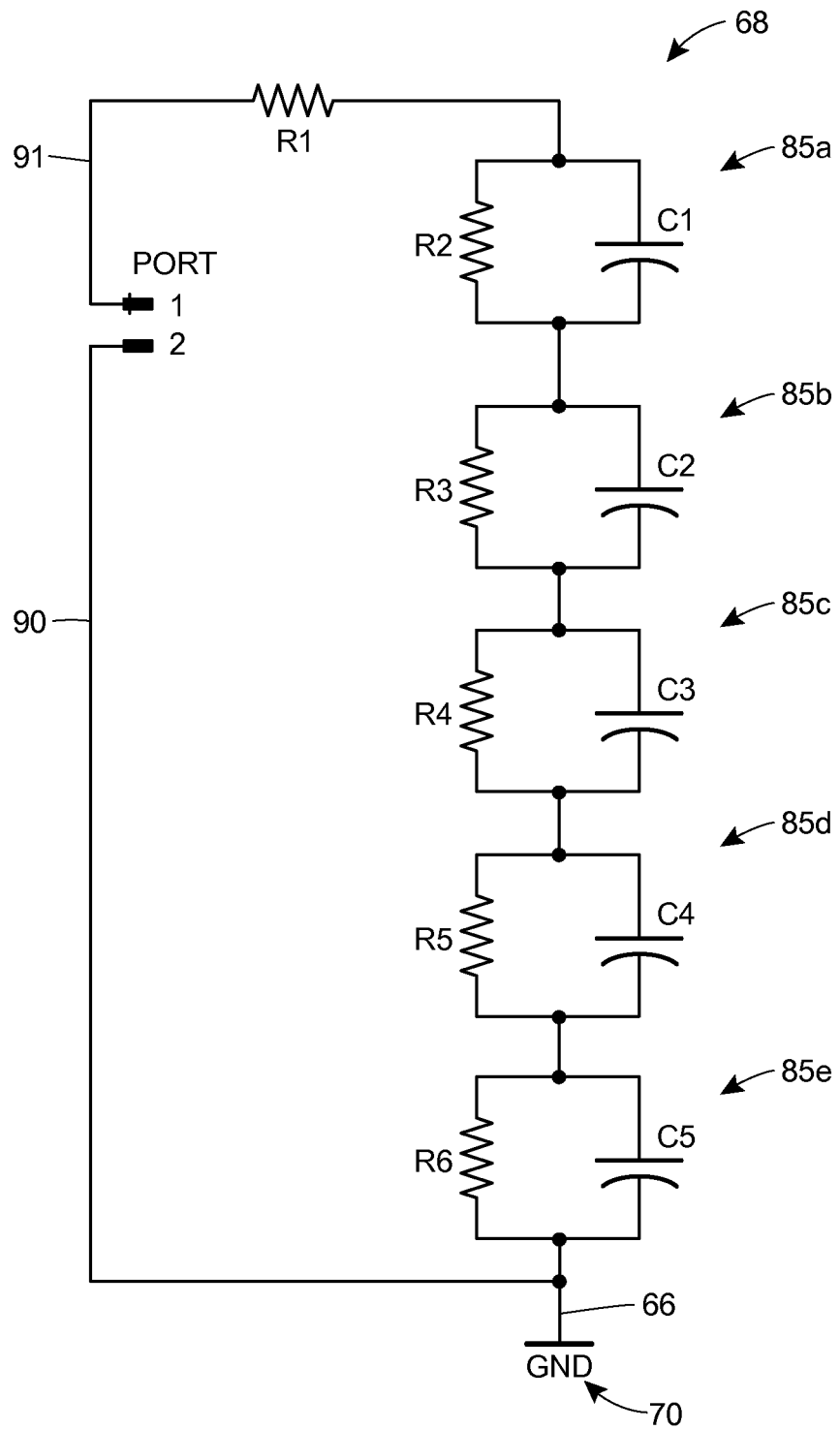
FIG. 6 is a schematic view of an embodiment of an impedance network.
Figure 7:
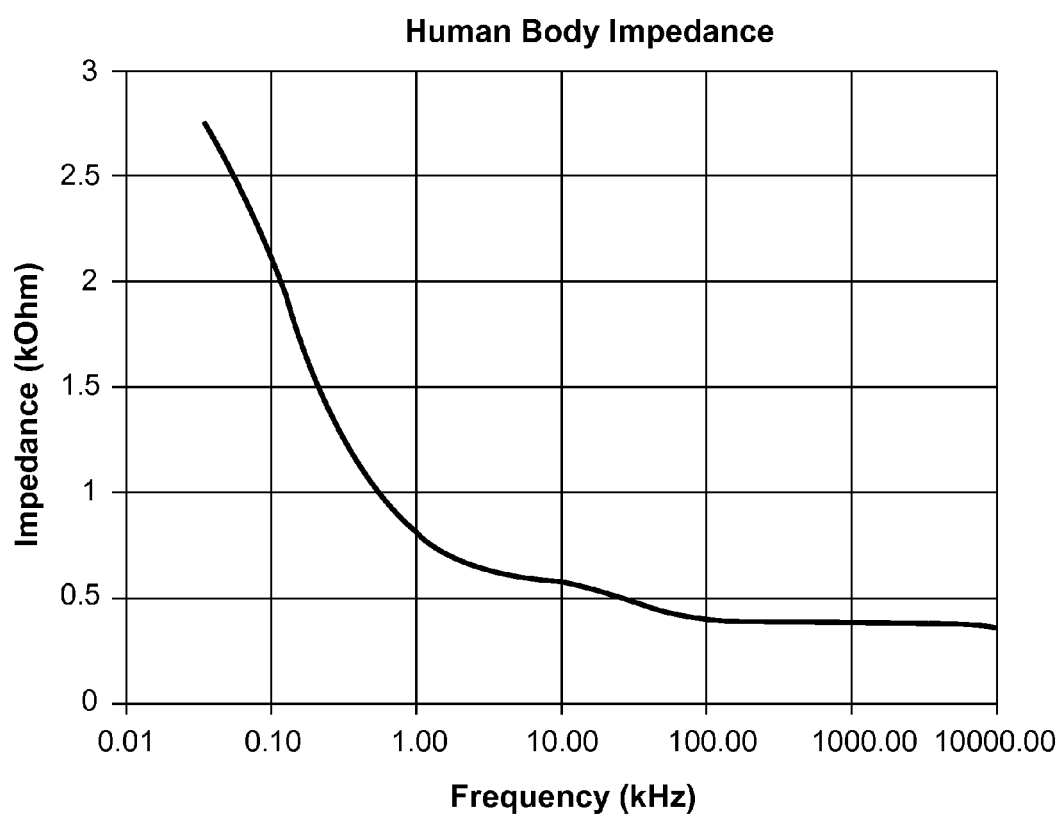
FIG. 7 is a chart illustrating the relationship between frequency and human body impedance.

The impedance network 68 may include any suitable elements or configurations that cooperate with the first material 56 and second material 58 to replicate or result in an impedance output that is identical or substantially identical to the impedance of a human finger over a range of frequencies. That is, the impedance network 68 may be frequency dependent, and the impedance network 68 and the simulation member 22 may cooperate to output impedance based on an input frequency as indicated, for example, in the graph of FIG. 7. As illustrated in FIG. 6, an embodiment of the impedance network 68 may include a first resistor R1 that is connected in series to a plurality of sub-circuits 85*a*-85*e*, and the first resistor R1 may have a value of about 61.2Ω, for example. Each of the plurality of sub-circuits 85*a*-85*e* includes a resistor in parallel with a capacitor. For example, a first sub-circuit 85*a* may include a second resistor R2 in parallel with a first capacitor C1. The second resistor R2 may have a value of about 14.4 kΩ and the first capacitor C1 may have a value of about 4.63 µF, for example. A second sub-circuit 85*b* may include a third resistor R3 in parallel with a second capacitor C2. The third resistor R3 may have a value of about 1.55 kΩ and the second capacitor C2 may have a value of about 0.875 µF, for example. A third sub-circuit 85*c* may include a fourth resistor R4 in parallel with a third capacitor C3. The fourth resistor R4 may have a value of about 281.6Ω and the third capacitor C4 may have a value of about 0.65 µF, for example. A fourth sub-circuit 85*d* may include a fifth resistor R5 in parallel with a fourth capacitor C4. The fifth resistor R5 may have a value of about 209.7Ω and the fourth capacitor C4 may have a value of about 29.57 nF, for example. A fifth sub-circuit 85*e* may include a sixth resistor R6 in parallel with a fifth capacitor C5. The sixth resistor R6 may have a value of about 316.3Ω and the fifth capacitor C5 may have a value of about 4.63 pF, for example. The fifth sub circuit 85*e* may be connected to the ground 70 by, for example, the second conductive wire 66.

As illustrated in FIG. 6, the impedance network 68 may additionally include a first port 88*a* that is connected by a conductive wire 91 to the first resistor R1, and the first conductive wire 64 (see FIG. 1) that is connected to the simulation member 22 may be coupled to the first port 88*a*. A second port 88*b* of the impedance network 68 may be connected to a conductive wire 90 that is connected to the second conductive wire 66 such that the second port 88*b* is connected to the ground 70. In other embodiments, the first resistor R1 may be directly connected to the simulation member 22 without a first port 88*a*, and the first resistor R1 may be connected to the simulation member 22 by the first conductive wire 64 (see FIG. 1). In addition, the fifth sub circuit 85*e* may be connected to the ground 70 by the second conductive wire 66 (see FIG. 1) without a connecting the segment 89.

So configured, in the second position 20, when the first end 24 of the simulation member 22 (that is, the first portion 52 of the simulation member 22) contacts a portion of the blade 16 of the saw 12, current from the blade 16 passes through the simulation member 22, the first conductive wire 64, the impedance network 68, and the second conductive wire 66 to the ground 70, and the first impedance and second impedance of the first material 56 and second material 58, respectively, is identical to or substantially identical to the impedance or combined impedances of the organic materials that compose the human finger. In some embodiments, a power supply (not shown) may be connected to the circuitry 28 (e.g., such as to the second end of the second conductive wire 66) to generate a current in the simulation member 22 such that the blade 16 senses the resulting first impedance and second impedance of the first material 56 and second material 58, respectively to trigger the saw's stop mechanism 11.

In other embodiments, the circuitry 28 and simulation member 22 may cooperate to replicate a thermal property (i.e., temperature) and a physical shape of a human finger body. Specifically, some embodiments of available stop mechanisms 11 have a thermal imaging trigger system in which a thermal camera identifies a finger in the immediate proximity of the blade 16 of the saw 12 by one or both the temperature signature of a human finger and the shape of a human finger. Accordingly, to consistently and repeatably trigger such stop mechanism 11, the circuitry 28 may include one or more components that may result in the temperature of the simulation member 22 to be identical or nearly identical to that of a human finger. For example, one or more resistors and a power source (not shown) may be operatively coupled to the simulation member 22. So configured, when the first end 24 of the simulation member 22 contacts or nearly contacts a portion of the blade 16 of the saw 12, (i.e., when the support arm 14 is in the second position 20), the thermal imaging trigger system will detect the simulation member 22 to engage the stop mechanism 11 of the saw 12.

To calibrate the simulation member 22 (and circuitry 28) to find an overall impedance, signal variation due to human finger position was first determined. That is, signal variation due to use of a left, middle, and right portion of a finger was tested, and the signal variation was determined to be negligible. Signal variations of different sized humans was tested, and it was determined that signal response does not correlate with body weight or height. The signal response of a human finger was measured under wet and dry conditions, and it was observed that a dry finger has a lower signal response than a wet finger. A graph of the impedance of a wet human finger along a range of AC frequencies is provided in FIG. 7, and an output of the impedance network 68 may be equal to or approximately equal to the impedance of a wet human finger over the range of AC frequencies. In addition, an output of the impedance network 68 may be equal to or approximately equal to the impedance of a dry human finger over the range of AC frequencies. A simulation member 22 having the first portion 52 having a high impedance material and a second portion 54 having a low impedance material was next tested for signal variation, and the simulation member 22 was operatively connected to a impedance network that was operatively connected to a ground. A value (or range of values) of the impedance network was then determined that will accurately generate a signal variation that is substantially identical to the signal variation of a dry finger, which is the weakest human signal variation. Testing has shown that the simulation member 22 with the first portion 52 having a high impedance material and a second portion 54 having a low impedance material, and coupled to an impedance network that is coupled to a ground was found to achieve the signal response similar to the weakest human touch signal response (i.e., a dry finger touch). Other objects that may be used to trigger (or to attempt to trigger) a stop mechanism achieve inconsistent results. For example, a hot dog may sometimes trigger a stop mechanism, but the signal variation is relatively large and therefore does replicate the signal variation of a human finger. Accordingly, repeatable and accurate testing of how a human finger can trigger a given stop mechanism is not possible by using a hot dog.

In use, the support arm 14 may be initially placed in the first position 18 such that first end 24 of the simulation member 22 (e.g., the outer surface 63 of the first portion 52) is offset from and not in contact with a portion of the blade 16 of the saw 12, as illustrated in FIG. 1. The support arm 14 may have any suitable orientation relative to the blade 16 to allow the first end 24 of the simulation member 22 to be offset from the blade 16 in the first position 18 and to allow the first end 24 of the simulation member 22 to contact a desired portion of the blade 16 in the second position 20. For example, if the actuator 42 displaces the support arm 14 linearly along the longitudinal axis 30 of the support arm 14, the support arm may 14 be oriented with the longitudinal axis 30 in or parallel to (or substantially in or parallel to) a plane of rotation of the blade 16, and the longitudinal axis 30 may be oriented towards an axis of rotation of the blade 16.

So disposed, the power to the saw 12 is activated and a command is given to the actuator 42 to translate the support arm 14 and the simulation member 22 towards the blade 16 along the longitudinal axis 30 from the first position 18 to the second position 20, as shown in FIG. 2. As illustrated in FIG. 1, one or more sensors 72 that may be in communication with a processor, such as the processor 46, may be provided to determine the rotational speed of the blade 16. The rate of travel of the actuator 42 (and thus the support arm 14 and the simulation member 22) towards the blade 16 may be constant and may be repeatable. For example, the rate of travel may be 2.5 m/s. When contact occurs between the first end 24 of the simulation member 22 and the blade 16 in the second position 20, the contact may immediately or nearly immediately trigger the stop mechanism 11 of the saw 12, and the blade 16 will cease (or substantially cease) its rotation and/or will retract away from the simulation member 22. As illustrated in FIG. 1, a sensor 74, such as a photo detector, may be in communication with a processor, such as the processor 46, and the sensor 74 may determine when an indication light 76 of the stop mechanism 11 illuminates.

Because the parameters (e.g., actuator 42, travel rate, direction of contact, shape and rigidity of the simulation member 22) of the test apparatus 10 are consistent and/or repeatable when testing various stop mechanisms 11, the performance of a first stop mechanism can be compared to the performance of a second stop mechanism. For example, damage to the first end 24 of the simulation member other simulation member 22 used to test various stop mechanisms 11. That is, a depth of a cut in a first simulation member 22 caused by a blade 16 of a first saw 12 may be compared with a depth of a cut in a second simulation member 22 caused by a blade 16 of a second saw 12. The depth of each cut may be determined to be within an acceptable range—that is, a range in which no permanent damage to a human finger would result. For example, the depth of cut may be measured by imaging analysis and the depth should be less than 4 mm That is, the depth of any point of a cut in the simulation member 22 should be within 0 to 4 mm of an outermost surface of the first portion 52 and/or the second portion 54, and the outermost surface may be the surface in which the cut is made. Accordingly, the test apparatus 10 allows for a consistent and predictable triggering of a variety of stop mechanisms 11 used on a variety of rotary saws, thereby allowing corresponding performance characteristics of each stop mechanism 11 to be compared.

Figure 5A:
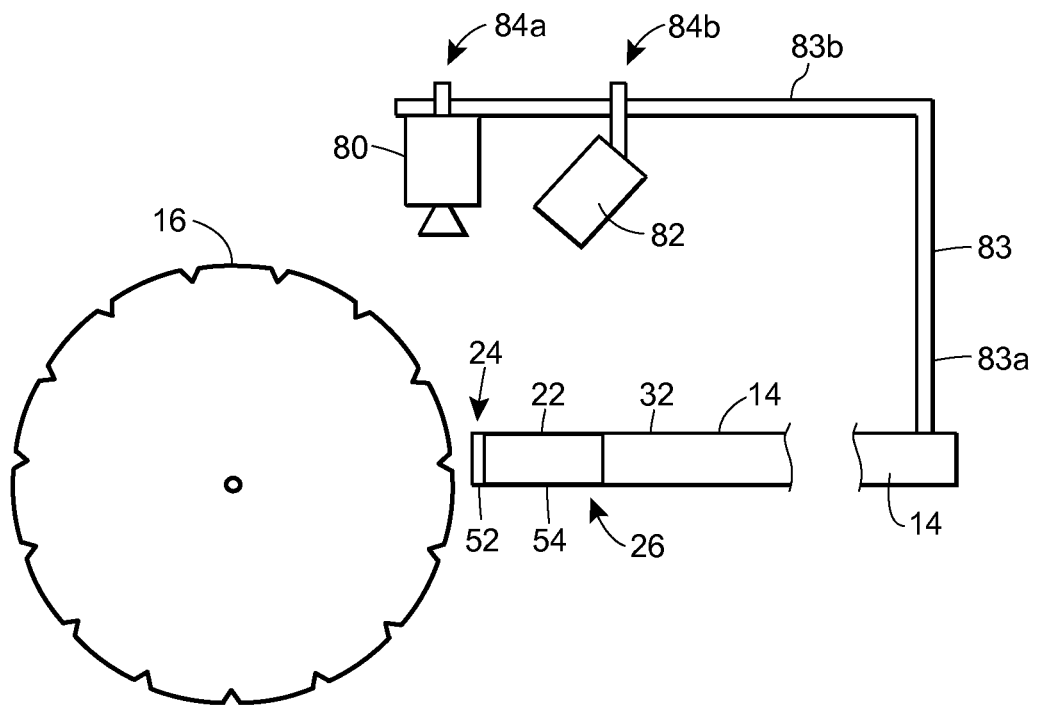
FIG. 5A is a schematic side view of an embodiment of a test apparatus.
Figure 5B:
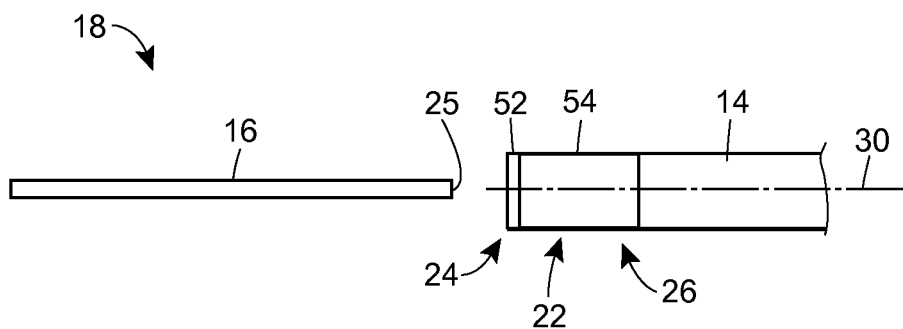
FIG. 5B is a top view of the support arm in the first position.
Figure 5C:
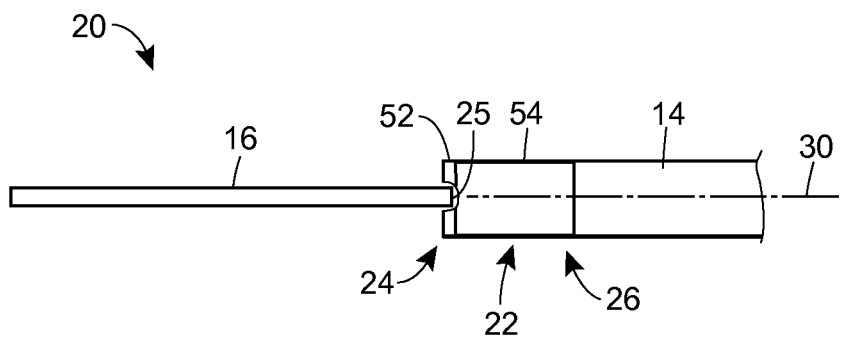
FIG. 5C is a top view of the support arm in the second position.

Referring to FIG. 5A, an embodiment of the test apparatus 10 may include a camera arm 83 that may be secured to the support arm 14 (or may be directly or indirectly secured to the support frame 38 illustrated in FIG. 1), and the cameral arm 83 may be adapted to support a camera 80 (e.g., a digital camera) and/or a light source 82. The camera arm 83 may have any shape or configuration that allows at least one of the camera 80 or the light source 82 to be supported such that the camera 80 is capable of taking a photograph of the first end 24 of the simulation member 22 and the portion 25 of the blade 16 contacting the simulation member 22 when the simulation member 22 is in the second position 20. More specifically, the camera arm 83 may include a first member 83a that extends normal (or substantially normal) to the longitudinal axis 30 of the support arm 14, and the camera arm 83 may also include a second member 83b that may extend parallel (or substantially parallel) to the longitudinal axis 30 of the support arm 14. So configured, the second member 83b may be aligned with (and vertically offset from) the longitudinal axis 30 of the support arm 14 when viewed normal to the longitudinal axis 30 of the support arm 14. The camera 80 may be secured or coupled to a first portion 84a of the second member 83b of the camera arm 83. The first portion 84a may be disposed at any location of the second member 83b that centers the camera's 80 field of view at the first end 24 of the simulation member 22. The light source 82 may be secured or coupled to a second portion 84b of the second member 83b of the camera arm 83, and the second portion 84b may be any location that suitably illuminates the first end 24 of the simulation member 22. Because the camera arm 83 is secured to the support arm 14, the camera arm 83 displaces with the support arm 14 and the position of the first end 24 of the simulation member 22 is fixed relative to the camera 80 and the light source 82. When the support arm 14 translates from the first position 18 (see FIG. 5B) to the second position 20 (see FIG. 5C), the camera 80 is positioned to record or photograph the portion 25 of the saw 16 impacting the first end 24 of the simulation member 22 to allow for an accurate measurement of the depth of the cut that results in the simulation member 22.

While various embodiments have been described above, this disclosure is not intended to be limited thereto. Variations can be made to the disclosed embodiments that are still within the scope of the appended claims.

What is claimed is:
1. A test apparatus for the testing of a stop mechanism of a saw, the test apparatus comprising:
 a support arm movable relative to a blade of the saw from a first position to a second position;
 a simulation member coupled to the support arm, the simulation member having a first end and a second end, wherein in the first position, the first end of the simulation member is adapted to be offset from a portion of the blade of the saw, and in the second position, the first end of the simulation member is adapted to be in contact with or immediately adjacent to the portion of the blade of the saw, wherein the simulation member includes a first portion comprising a first material and a second portion comprising a second material that is different than the first material, wherein the first portion is disposed at the first end of the simulation member; and
 circuitry operatively connected to the simulation member, wherein the circuitry and simulation member cooperate to replicate an electrical property of a human finger such that contact between the blade and the first end of the simulation member when the support arm is in the second position triggers the stop mechanism of the saw.

2. The test apparatus of claim 1, wherein the electrical property is an impedance of the simulation member, wherein the impedance of the simulation member is identical or substantially identical to an impedance of a human finger.

3. The test apparatus of claim 1 wherein the first material has a first impedance and the second material has a second impedance less than the first impedance.

4. The test apparatus of claim 3 wherein the first impedance is generated by a material with resistivity between 100 kΩ·cm and 10 MΩ·cm and the second impedance is generated by a material with resistivity between 0 and 10 Ω·cm.

5. The test apparatus of claim 3, wherein the first material and the second material are both a conductive organic material.

6. The test apparatus of claim 1, wherein the support arm linearly displaces from the first position to the second position.

7. The test apparatus of claim 1, wherein the circuitry includes a frequency dependent impedance network connected to a ground.

8. The test apparatus of claim 7, wherein the impedance network includes a resistor connected in series to a plurality of sub-circuits, wherein each of the plurality of sub-circuits includes a capacitor.

9. A test apparatus of claim 8, wherein each of the plurality of sub-circuits includes a capacitor and a resistor connected in parallel.

10. The test apparatus of claim 1, wherein the simulation member is elongated and extends along a longitudinal axis, and wherein the second portion is disposed between the first portion and the first end of the support arm.

11. The test apparatus of claim 10, wherein the first portion has a planar inner surface disposed normal to the longitudinal axis and a planar outer surface disposed normal to the longitudinal axis, wherein the inner surface is longitudinally offset a first distance from the outer surface.

12. The test apparatus of claim 11, wherein the first distance is in the range of about 1.0 mm to about 0.25 mm.

13. The test apparatus of claim 10, wherein the support arm is elongated and has a longitudinal axis coaxial with the longitudinal axis of the simulation member, and wherein the support arm displaces from the first position to the second position along the longitudinal axis of the support arm.

14. The test apparatus of claim 1, further comprising a support frame, and the support arm is displaceably coupled to the support frame.

15. A method of testing a stop mechanism of a saw, the method comprising:
    activating the rotation of a blade of the saw;
    displacing a support arm relative to a portion of the blade of the saw from a first position in which a first end of a simulation member coupled to the support arm is offset from the portion of the blade of the saw to a second position in which the first end of the simulation member is in contact with the portion of the blade of the saw to trigger the stop mechanism,
    wherein the first end of the simulation member is a portion of a first portion, and wherein a second portion of the simulation member is disposed between the first portion and the support arm, and wherein the first portion comprises a first material and the second portion comprises a second material that is different than the first material.

16. The method of claim 15, further comprising measuring a depth of a cut made in the simulation member resulting from contact with the portion of the blade of the saw.

17. The method of claim 16, further comprising determining whether the depth of the cut is within an acceptable range.

18. The method of claim 15, wherein the first material has a first impedance and the second material has a second impedance less than the first impedance.

19. The method of claim 18, wherein the first impedance is generated by a material with resistivity between 100 kΩ·cm and 10 MΩ·cm and the second impedance is generated by a material with resistivity between 0 and 10 Ω·cm.

20. The method of claim 18, wherein the first material and the second material are both a conductive organic material.

21. The method of claim 18, further comprising calibrating an overall impedance of the simulation member.

22. The method of claim 21, wherein calibrating the overall impedance includes determining signal variations of human fingers under wet and dry conditions.

23. The method of claim 21, wherein calibrating the overall impedance includes operatively connecting the simulation member to a impedance network that is operatively connected to a ground, and determining a value for the impedance network that will accurately generate a signal variation that is substantially identical to the signal variation of a dry finger.

24. The method of claim 16, further comprising comparing the depth of the cut made in the simulation member to a depth of a cut made by a different saw in a different simulation member.

25. A test apparatus for the testing of a stop mechanism on a saw, the test apparatus comprising:
    a support arm movable relative to a blade of the saw from a first position to a second position;
    a simulation member coupled to the support arm, the simulation member having a first end and a second end, wherein the simulation member includes a first portion comprising a first material and a second portion comprising a second material, wherein the first portion is disposed at the first end of the simulation member, and wherein the first material is different than the second material, wherein in the first position, the first end of the simulation member is adapted to be offset from a portion of the blade of the saw, and in the second position, the first end of the simulation member is adapted to be in contact with or immediately adjacent to the portion of the blade of the saw; and
    an impedance network electrically coupled to the simulation member, the impedance member comprising at least one resistor and at least one capacitor, the impedance network and the simulation member cooperate to replicate an electrical property of a human finger such that contact between the blade and the first end of the simulation member when the support arm is in the second position triggers the stop mechanism of the saw.

26. A test apparatus of claim 25, wherein the impedance network includes a resistor connected in series to a plurality of sub-circuits, wherein each of the plurality of sub-circuits includes a capacitor.

27. A test apparatus of claim 26, wherein each of the plurality of sub-circuits includes a capacitor and a resistor connected in parallel.

* * * * *

UNITED STATES PATENT AND TRADEMARK OFFICE
CERTIFICATE OF CORRECTION

| | | |
|---|---|---|
| PATENT NO. | : 9,550,310 B2 | |
| APPLICATION NO. | : 14/530531 | |
| DATED | : January 24, 2017 | |
| INVENTOR(S) | : Fan He et al. | |

It is certified that error appears in the above-identified patent and that said Letters Patent is hereby corrected as shown below:

In the Claims

At Column 11, Line 27, "A test" should be -- The test --.

At Column 12, Line 58, "A test" should be -- The test --.

At Column 12, Line 62, "A test" should be -- The test --.

Signed and Sealed this
First Day of August, 2017

Joseph Matal
*Performing the Functions and Duties of the*
*Under Secretary of Commerce for Intellectual Property and*
*Director of the United States Patent and Trademark Office*